3,320,133
PREPARATION OF A FACE LOTION WITH A PEARLY LUSTER
Kazuo Suga and Takeshi Yamamoto, Tokyo, Japan, assignors to Toyo Koatsu Industries, Incorporated, Tokyo, Japan, a corporation of Japan
No Drawing. Filed Feb. 6, 1963, Ser. No. 256,516
Claims priority, application Japan, Feb. 8, 1962, 37/3,929
1 Claim. (Cl. 167—91)

This invention relates to a method of producing a face lotion with a pearly luster suspending fatty acid crystals containing fat-soluble beauty nutriments and phenols.

The conventional fat-soluble beauty nutriment has been used mostly as an emulsion. However, the emulsion has so much of an oil agent that the degree of absorption of the beauty nutriment into a skin keratin is supposed to be low because the keratin is hydrophilic. In case a large amount of the beauty nutriment is to be contained in a lotion, it becomes a suspension, its grains are present in any size and therefore separate and there is a defect of reducing the commodity value.

Generally, according to Stokes' law, the velocity V of the separation of a cream is represented by the formula $$V = \frac{2(d_1 - d_2) \times g \times r^2}{9N}$$

wherein $d_1$ is the density of a solid, $d_2$ is the density of a liquid, $g$ is the acceleration of gravity, $N$ is the viscosity of the liquid and $r$ is the radius of the solid grain.

Therefore, in order to make the grains stably present in the liquid, it is desirable to make the difference between the specific gravity of the grain and that of the liquid as small as possible and to make the size of the grain as small and uniform as possible. In order to obtain a liquid satisfying such requirements, the treating conditions in the production are important.

As a result of studying a method of producing a face lotion by applying the above mentioned law, we have discovered that, in the case of depositing fatty acid crystals containing phenol compounds from a solution, if a specific soluble highly polymerized substance is added to the solution, crystals of a uniform size are crystallized and the crystals emit a pearly luster and can be stably floated in the solution. In such case, the growth of the crystals is inhibited by the presence of the soluble highly polymerized substance and therefore there is no fear that the crystals separate with the lapse of time.

In such case, generally, the high temperature treatment accelerates the growth of the grains. But, when the above mentioned suspension obtained by the present invention is treated at a high temperature, the crystals redissolve and therefore does not grow.

In the method of the present invention, in order to produce a lotion containing a large amount of fat-soluble beauty nutriments, first of all, an oil or fat or fatty acid containing such beauty nutriments as a vitamin, hormone and phosphatide and such phenols as orizanol, ferulic acid and cinnamic acid is made water-soluble by using an amine or an inorganic alkali salt, then the excess oil or fat is prevented from precipitating and is made perfectly water-soluble by using an ethylene oxide additive, fatty acid polyhydric alcohol ester, phenol, aromatic acid salt, acid amide or any other known solubility increasing agent and then, for example, polyvinyl pyrrolidone and then a monohydric alcohol are added to obtain floating crystals emitting a pearly luster. In such case, the adding temperature and the cooling temperature are important and the adding order must not be mistaken. Further, in such case, said phenols (such as orizanol, ferulic acid or cinnamic acid) added in advance are considered to act effectively as nucleic of crystals. In the above treatment, the amount of the suspended lustrous crystals can be adjusted by adjusting the amounts of the oil or fat containing the beauty nutriments, solubility increasing agent, polyvinyl pyrrolidone, phenol forming nucleic of the crystals and monohydric alcohol. Throughout all the treating steps, no high treating temperature is desirable, a treating temperature below 80° C. is proper and it is proper to use 0.1–20% of the oil or fat, the amine in an amount equivalent to the oil or fat and about 0.1–20% of the polyvinyl pyrrolidone. Further, instead of the polyvinyl pyrrolidone, there may be used such highly polymerized compound as polyvinyl alcohol, sodium polymethacrylate, sodium polyacrylate or Carbopol (trade name of carboxypolymethylene) or such lowly polymerized compound as vinyl pyrrolidone or pyrrolidone.

The lotion obtained by the above mentioned treatment will show a weak acidity, the suspended crystals emit a pearly luster and does not separate with the lapse of time and its commodity value is high. In order to obtain a lotion presenting a weak alkalinity, the method of the present invention may be carried out by using an excess of an amine or inorganic alkali salt or by using such substance as polyvinyl alcohol or sodium polyacrylate instead of the polyvinyl pyrrolidone. In the present invention, any proper buffer solution can be used instead of water.

Examples of the present invention are presented wherein all parts are by weight.

*Example 1*

Solution A consisted of 5 parts of stearic acid, 2 parts of linoleic acid and linolenic acid, 3 parts of triethanol amine and 30 parts of water.

Solution B consisted of 1 part of isopropyl myristate, 0.8 part of orizanol and 4.0 parts of a solubility increasing agent consisting of 35 parts of polyoxyethylene stearate and 0.5 part of decyl alcohol.

Solution C consisted of 2.0 parts of polyvinyl pyrrolidone, 5 parts of propylene glycol, 5 parts of ethanol and 15.0 parts of water.

Solution D consisted of 0.5 part of allantoin, 0.5 part of a perfume, 0.2 part of an antiseptic and 25.0 parts of water.

The solution A was mixed and was made to react at a temperature of 60–80° C. After the completion of the reaction, the solution was cooled down to 50° C. and the solution B heated to the same temperature was mixed therein. In such case, the mixed solution was quite transparent and was weakly acid or in the range of pH 4.5–6.5. When the pH of the solution deviated from this pH range, it was adjusted to be of the above value or in the range of pH 4.5–6.5 by further controlling the amount of the linoleic acid and linolenic acid in the solution A. After the pH of the mixed solution of A and B was adjusted, the solution C cooled to about 10° C. was dropped into the mixed solution of A and B and the mixture was vigorously stirred. Though the temperature of the solution reduced due to the dropping of the solution C, any quick reduction of the temperature of the solution was not desirable and therefore it was necessary to add the solution C little by little. After the completion of the dropping, the mixture was left to stand for 2–10 hours and then the solution D was mixed therein. Thus the obtained solution was a solution having a pH of 4.5–6.5 and floating 8% of uniform crystals of about 10μ. Even when no outside vibration was given, said product solution floated the crystals stably and emitted a pearly luster in the sunshine.

Example 2

Solution A consisted of 10 parts of lauric acid, 3 parts of arachidonic acid, 7 parts of diethanol amine and 30 parts of water.

Solution B consisted of 1 part of isopropyl palmitate, 1 part of orizanol-containing ferulic acid, 4.5 parts of polyoxyethylene octylphenol and 0.5 part of sodium benzoate.

Solution C consisted of 934.3 parts of Carbopol, 4 parts of sorbitol, 5 parts of ethanol and 10 parts of water.

Solution D consisted of 0.5 part of hydrocortisone acetate, 0.5 part of a perfume, 0.5 part of vitamin $B_6$, 0.5 part of antiseptic and 19 parts of water.

The product was obtained from the above mentioned solutions A, B, C and D by the same treatment as in Example 1.

Example 3

Solution A consisted of 13 parts of palmitic acid, 5 parts of oleic acid, 7 parts of monoethanol amine and 30 parts of water.

Solution B consisted of 1 part of butyl linolate, 0.5 part of ferulic acid, 0.5 part of cinnamic acid and 5 parts of polyoxypropylene oxyethylene cetyl alcohol.

Solution C consisted of 4 parts of sodium polyacrylate, 3 parts of polyglycol, 5 parts of ethanol and 10 parts of water.

Solution D consisted of 1.0 part of glytyl lyten, 0.5 part of a phosphate derivative (including lecithin), 0.5 part of a perfume, 0.5 part of vitamin C and 12.0 parts of water.

The product was obtained from the above mentioned solutions A, B, C and D by the same treatment as in Example 1.

What is claimed is:

A method for producing a face lotion with a pearly luster which comprises:

adding at a temperature not greater than 80° C. 0.1 to 20 parts of an amine to 0.1 to 20 parts of at least one fatty compound containing beauty nutriments and a phenol;

adding thereto a solubility increasing agent in an amount sufficient to inhibit precipitation of said fatty compound;

adjusting pH to between 4.5 and 6.5; and adding thereto 0.1 to 20 parts of at least one stabilizing compound to stably float crystallized crystals in the solution, said amine being selected from the group consisting of monoethanolamine, diethanolamine and triethanolamine, said fatty compound being selected from the group consisting of fatty acids, fats and oils, said phenol being selected from the group consisting of orizanol, ferulic acid and cinnamic acid and said stabilizing compound being selected from the group consisting of polyvinyl pyrrolidone, sodium polyacrylate, sodium polymethacrylate, carboxy polymethylene, pyrrolidone and ethanol.

References Cited by the Examiner

UNITED STATES PATENTS 3,177,120    4/1965    Black _____ 167—91

OTHER REFERENCES

Winter: American Perfumer, (Oct. 1936), pp. 49–50.
Drug and Cosmetic Industry, (July 1955) page 95.
Bennett: Cosmetic Formulary, (1937) page 41.
De Navarre: The Chemistry & Manufacture of Cosmetics, (1941) p. 246.
Sagarin: Cosmetics Science and Technology, (1957) pp. 1053–1054 and 1008.

ALBERT T. MEYERS, *Primary Examiner.*

JULIAN S. LEVITT, *Examiner.*

STANLEY J. FRIEDMAN, *Assistant Examiner.*